Figure 1:
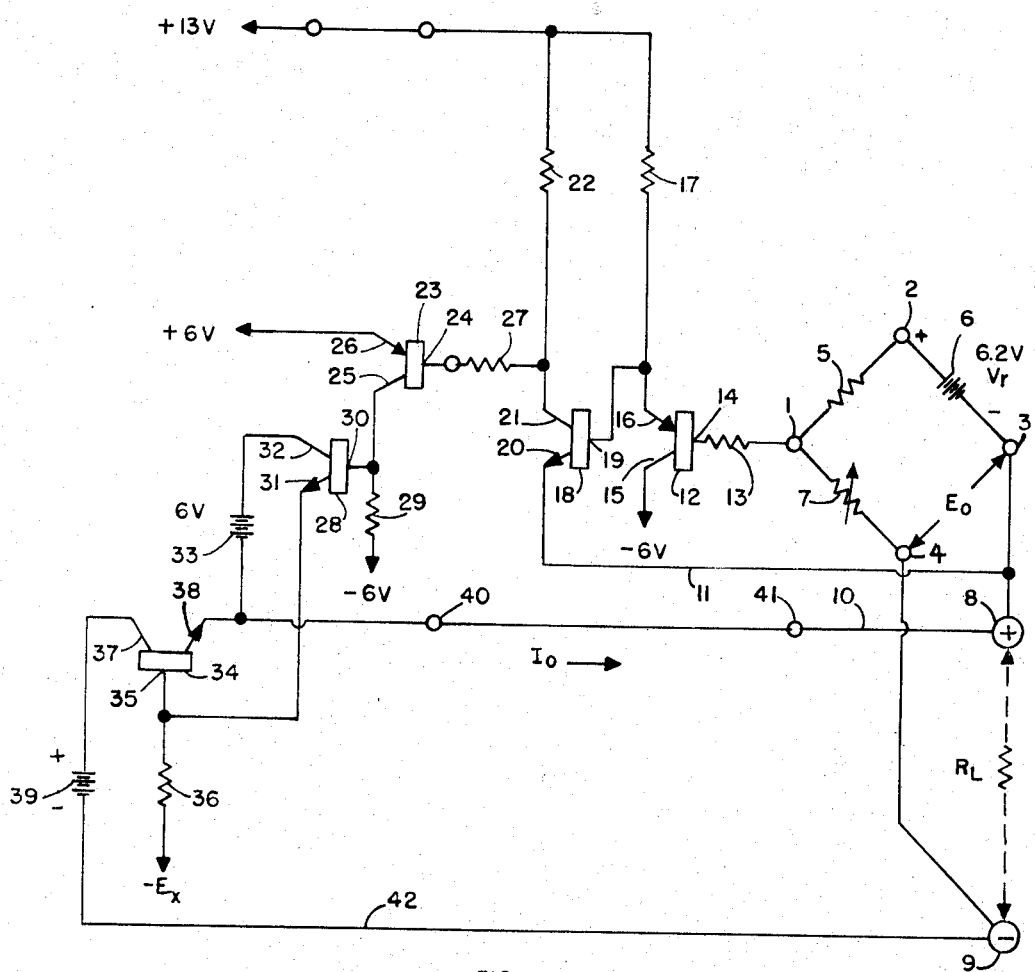

March 12, 1968    J. R. GATELY    3,373,342
CURRENT CUTOFF CIRCUIT FOR REGULATED POWER SUPPLY
Filed Feb. 3, 1966    2 Sheets-Sheet 1

INVENTOR.
JOSEPH R. GATELY
BY
*Alfred W. Barber*
ATTORNEY

INVENTOR.
JOSEPH R. GATELY
BY
*Alfred W. Barber*
ATTORNEY

United States Patent Office 3,373,342
Patented Mar. 12, 1968

3,373,342
CURRENT CUTOFF CIRCUIT FOR REGULATED POWER SUPPLY
Joseph R. Gately, Woodside, N.Y., assignor to Forbro Design Corp., New York, N.Y., a corporation of New York
Filed Feb. 3, 1966, Ser. No. 524,789
7 Claims. (Cl. 323—9)

The present invention concerns voltage regulating, current limiting power supplies utilizing alteranting current input and providing direct current output.

A familiar type of regulating circuit for voltage regulated power supply utilizes a series pass transistor to control and regulate the output voltage of an AC to DC type of power supply. The pass transistor is controlled by means of an amplifier which amplifies an error signal generated by comparing the DC output voltage with a reference voltage. The reference and comparison may be carried out by means of a comparison bridge circuit as shown and described in U.S. Patent No. 3,028,538. The error signal developed in the comparison bridge is amplified by a high gain DC amplifier such as the one described in U.S. Patent No. 3,028,538 and is applied to the base of the pass transistor. The polarities in the bridge, error amplifier and pass transistor are made such that when the output voltage drops below the voltage called for by the system, the impedance of the pass transistor is decreased causing more current to flow to the output and vice versa in order to correct the output voltage and to maintain it at the called for value. With high gain error amplifiers the output voltage can be maintained extremely accurately by such a system.

However, this regulating system may be subject to conditions which may cause excessive current to flow in the pass transistor, for example, the condition which exists when the output terminals of such a power supply are short circuited. In order to protect the pass transistor under these conditions various means have been adopted to limit the maximum output current as, for example, the protective circuits shown and described in U.S. Patent No. 3,131,344.

While current limiting circuits in general provide a certain amount of protection to the pass transistor, they leave something to be desired. For example, if the maximum output current rating of a regulated power supply has a certain value and the current limiting circuit limits the short-circuit current to 125 percent of this maximum value, the pass transistor under short-circuit conditions is called on to pass 25 percent more current than it has to pass under normal full load conditions. With the output shorted, furthermore, the voltage across the pass transistor will be at a maximum and the worst possible power dissipation condition exists in it. All this means that the pass transistor and its circuits must be generally designed to handle considerably more power for short-circuit protection than for normal operation of the power supply. Since there is no way of predicting how long a short-circuit may exist, the system must be designed for continuous service under short-circuit. From a practical standpoint this calls for a considerable over design in such power supplies or for rating them well under their actual capabilities.

In accordance with the present invention a circuit is connected to the error amplifier which automatically limits the output current of the power supply to a predetermined value. A control is provided to preset this predetermined value to any desired current. This circuit provides a very sharp current limiting characteristic such that the normal regulation of the power supply is not degraded when the limiting current is set less than 5 percent above the actual operating current and then operates to hold the limiting current very constant under conditions calling for not less than the limiting current so that the power supply has essentially the characteristics of a constant voltage/constant current power supply with automatic cross-over. The principal advantage of the circuits of the present invention over conventional automatic cross-over circuits being that they are much simpler and less expensive to install.

In accordance with the present invention a voltage across a series current sampling resistor is compared with an adjustable reference voltage in a differential transistor amplifier circuit. When the sampled voltage indicates that a predetermined output current has been reached, a signal is injected in the error amplifier which prevents further increase in the output current and holds it accurately at the preset value. This circuit requiring only one transistor in addition to the two making up the differential pair is simple, effective and inexpensive. In addition the present circuit readily operates a mode indicator which will show whether the power supply is in voltage regulating mode or in current limiting or regulating mode.

Accordingly, one object of the present invention is to provide a simple, inexpensive and effective current limiting and current regulating circuit for voltage regulated power supplies.

Another object of the present invention is to provide a simple, inexpensive and effective current limiting and current regulating circuit for voltage regulated power supplies together with a simple mode indicator.

These and other objects will be apparent from the detailed description of the invention given in connection with the figures of the drawing.

In the drawing:
FIGURE 1 is a schematic circuit diagram of a regulated power supply in accordance with the present invention without the addition of the current limiting and mode indicating circuits.

Figure 2:
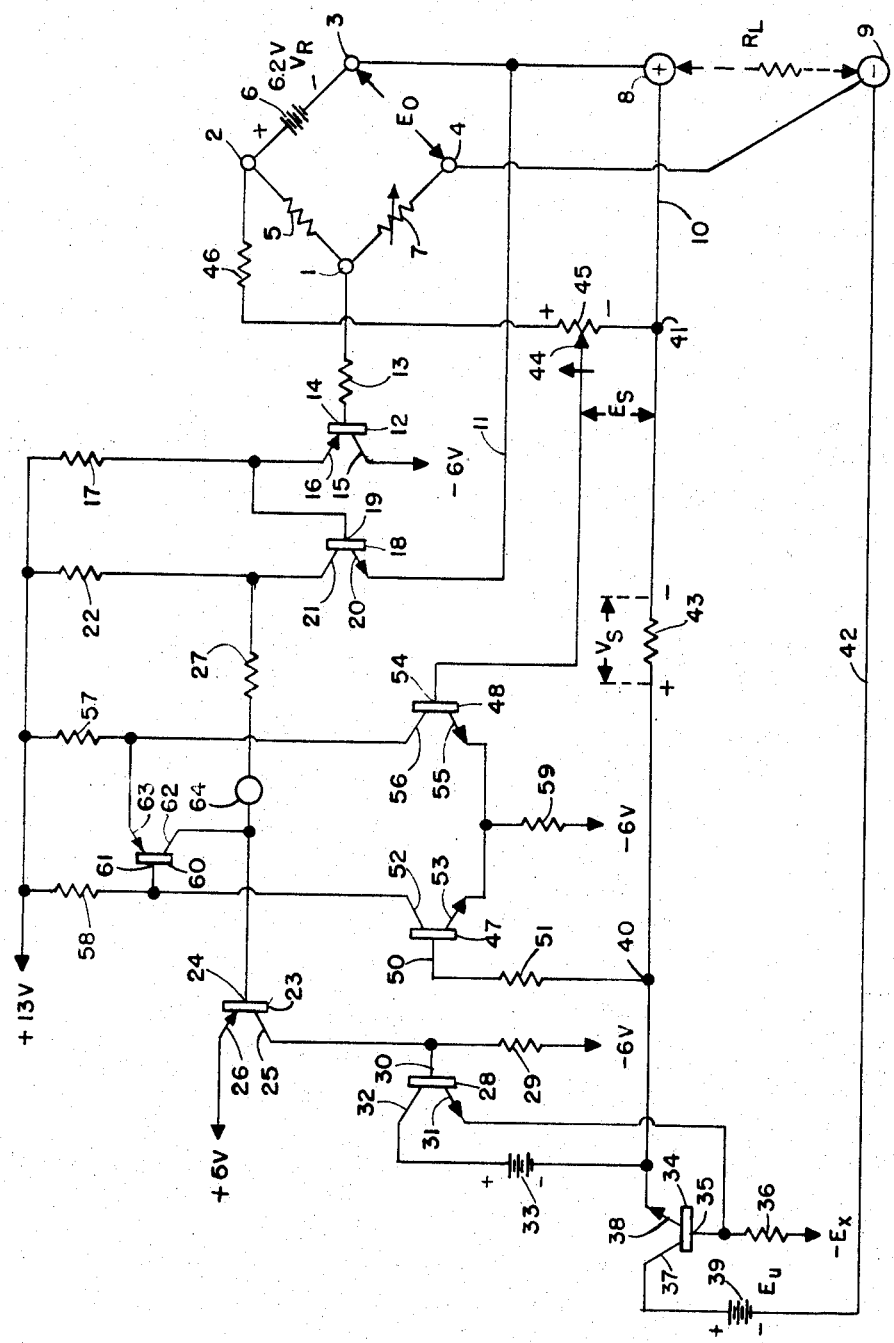

FIGURE 2 is the same as FIGURE 1 but with the current limiting/current regulating and mode indicating circuits added to complete the showing of the invention.

FIGURE 1 shows the circuit of the present invention without the current limiting circuits wherein for clarity and simplicity all voltage sources are shown as batteries or are merely indicated by reference to typical voltages with indicated polarity. In general, all these voltages sources would be provided from a single power transformer and suitable rectifiers and filters. Any actually required phase lagging networks have also been omitted from FIGURES 1 and 2 since they are not essential to an understanding of the invention. The comparison bridge is shown connected to terminals 1, 2, 3 and 4 and includes a suitable source of reference voltage 6 ($V_r$—6.2 v.) connected between terminals 2 and 3, a bridge current determining resistor 5 connected between terminals 1 and 2, a variable voltage control resistor 7 ($R_{vc}$) connected between terminals 1 and 4 and load terminals 8 and 9 for receiving the output voltage ($E_o$) connected to terminals 3 and 4 respectively. The bridge terminal 3 and the corresponding output terminal 8 (+) can be considered the common or reference potential point for the system. Loads to be supplied ($R_L$) with regulated voltage or current are connected between terminals 8 and 9. At balance an error signal approaching zero exists between terminals 1 and 3 i.e. the error signal exists between the common terminals 3 and terminal 1. This error voltage is applied to a first amplifier transistor 12 by connecting terminal 1 to base 14 through base current limiting resistor 13. Collector 15 is returned to a suitable source of bias voltage, not shown, but designated as —6 v. and emitter 16 is returned to a suitable source of emitter voltage, not shown, but designated as +13 v.

through emitter load resistor 17. Transistor 12 operates as an emitter follower and drives transistor 18 connected in a common emitter circuit. Base 19 is connected to emitter 16, emitter 20 is returned to the common reference point over lead 11 and collector 21 is returned to the +13 v. bias through collector load resistor 22. Thus, transistors 12 and 18 comprise the input stage of the error amplifier. The error amplifier also includes a second voltage amplifier stage provided by transistor 23 connected in a common emitter circuit. The amplified error signal from transistor 18 is applied to base 24 of transistor 23 through current limiting resistor 27. Emitter 26 is returned to a suitable source of bias, not shown, but designated as +6 v. Collector 25 is connected directly to base 30 of driver transistor 28 and through collector load resistor 29 to a suitable source of reverse bias, not shown, but designated —6 v. Transistor 28 is connected as a common collector stage and is the driver for the series pass transistor 34. Emitter 31 is directly connected to base 35 of transistor 34. Collector 32 is connected to a suitable source of bias represented by battery 33. Pass transistor 34 can be taken to represent a single pass transistor or more than one connected in parallel. Base 35 is returned to a suitable source of reverse bias, not shown, but designated $E_x$ through base current limiting resistor 36. Collector 37 is connected to the unregulated voltage source $E_u$ represented by battery 39 which is returned over line 42 to the negative output terminal 9 and bridge terminal 4. Emitter 38 is connected to the positive output terminal 8 and bridge terminal 3 over line 10. Along line 10 are two intermediate terminals 40 and 41 which will be described below.

In operation the circuit of FIGURE 1 operates to maintain balance in the comparison bridge so that the voltage between terminals 1 and 2 equals the reference voltage between terminals 2 and 3 and the output voltage between terminals 3 and 4 equals the voltage control voltage between terminals 1 and 4. If the output voltage between terminals 3 and 4 tends to depart from equality with the control voltage between terminals 1 and 4, an error signal appears between terminals 1 and 3 which is amplified by transistors 12, 18, 23 and 28 driving transistor 34 in such a direction as to cause more or less current to flow to the load and in a direction to tend to reduce the error voltage toward zero.

FIGURE 2 shows how the current limiting/current regulating and mode indicating circuits are connected with the circuits of FIGURE 1 described above. Similar components are designated by the same numbers in FIGURES 1 and 2. In order to establish the current limiting/current regulation a current sensing resistor 43 is connected in line 10 between points 40 and 41. The load current flowing through resistor 43 establishes a voltage drop thereacross which is proportional to the load current in $R_L$. A source of adjustable reference voltage is provided at tap 44 on potentiometer 45 which is connected on one side to point 41 and on the other side through resistor 46 to terminal 2 of the bridge circuit which carries the reference bias. In this way a range of voltage may be obtained at contact 44 from zero to some predetermined maximum voltage chosen to represent at least the maximum drop anticipated across sensing resistor 43.

The active part of the current limiting/current regulating circuit utilizes a differentially connected pair of transistors 47 and 48. Emitters 53 and 55 are returned to a suitable source of bias, not shown, but designated —6 v. through common emitter resistor 59. Base 50 is connected through base resistor 51 to terminal 40 and base 54 is connected to adjustable contact 44. Collectors 52 and 56 are returned to the +13 v. point through collector load resistors 58 and 57 respectively. With these connections it will be seen that bases 50 and 54 are both biassed in the same direction relative to the common line 10 (both positive). Whether transistor 47 or 48 conducts depends on the relative voltages on bases 50 and 54 respectively. Whichever base is the more positive will cause conduction of that transistor as its emitter voltage which follows the base voltage will cut-off the other of these transistors. For example, if contact 44 is set to bias base 54 at 1 volt, transistor 48 will conduct as long as across the sensing resistor 43 is less than this 1 volt. Now there is a transistor 60 connected with its base 61 connected to the collector end of resistor 58, its emitter 63 connected to the collector end of resistor 57 and its collector 62 connected to base 24 of transistor 23. When transistor 48 conducts and transistor 47 does not conduct as when base 54 is more positive than base 50, there is no voltage drop in resistor 58 so that base 61 is at substantially +13 v. but there is a voltage drop in resistor 57 due to collector current of transistor 48 and this drop makes emitter 63 negative with respect to base 61 so that transistor 60 is cut-off and does not conduct. In this condition collector 62 does not draw current and the error amplifier functions without any effect from the current limiting circuits.

Now, if the load resistance is decreased causing the load current through resistor 43 to increase to approach the 1 volt point (the selected reference on base 54), transistor 47 will start to conduct and a voltage drop will be developed in collector resistor 58. At the same time transistor 48 will start to cut-off decreasing the drop in resistor 57 and further aiding transistor 60 to conduct by increasing the negative bias on base 61 and decreasing it on emitter 63. When transistor 60 conducts, base 24 is made more positive due to the conduction from collector 62 to emitter 63 and through resistor 57 to +13 v. As base 24 goes more positive the drive of collector 25 on base 30 decreases and hence the drive on base 35 decreases and any further current increase through pass transistor 34 is prevented. This means that the output voltage adjusts itself to maintain constant current through the decreasing load resistance. As this constant output current but self adjusting output voltage takes place, the comparison bridge becomes unbalanced and transistor 18 is driven to saturation as the circuit attempts to rebalance the bridge. At this point, however, the circuit described above is in control and is maintaining a constant output current. With transistor 18 in saturation collector 21 approaches zero volts and resistor 27 becomes the collector load of transistor 60 in constant current mode. The change of current through resistor 27 when the system goes into current limiting/current regulating mode is very abrupt so that a meter or similar indicator 64 placed in series with resistor 27 will show a sudden flow of current and thereby signal the shift of the system from voltage mode to current mode.

As contact 44 is moved to higher or lower voltage positions on potentiometer 45, the cross-over to current regulating mode takes place at a higher or lower value of output current. The limiting value of the output current can be set at any point from the maximum rated output current down to substantially zero. The difference between operating and limiting values of output current is typically less than 5 percent of the maximum rated output current.

While only one form of the present invention has been shown and described, many modifications will be apparent to those skilled in the art and within the spirit and scope of the invention as set forth particularly in the appended claims.

What is claimed is:

1. In a direct current voltage regulating system, the combination of, a source of voltage to be regulated, output terminals for the regulated voltage, a signal responsive series pass device and a current sensing means connected in series between said source and one of said output terminals, a source of reference voltage, means for comparing the output voltage across said output terminals with said reference voltage to provide an error signal in accordance with the difference therebetween, a multistage transistor amplifier for amplifying said error signal to provide an augmented signal to control said pass device, a resistor in series between two stages of said amplifier, and means responsive to current of greater than a predetermined magnitude in said current sensing means including a transistor connected to said resistor for passing current in a predetermined direction through said resistor and thereby to at least partially disable said amplifier between said resistor and said series pass device.

2. A direct current voltage regulating system as set forth in claim 1 and including visual indicating means connected in series with said resistor for indicating the presence of more than a predetermined current flowing in said resistor.

3. A direct current voltage regulating system as set forth in claim 1 wherein said responsive means includes a source of adjustable reference voltage and means for comparing said reference voltage with the voltage drop across said current sensing means and wherein said responsive means responds when said comparison shows said drop across said current sensing means to be sensibly greater than said adjustable reference voltage.

4. A direct current voltage regulating system as set forth in claim 1 and including a source of adjustable voltage for determining said predetermined magnitude of current in said current sensing means.

5. A direct current voltage regulating system as set forth in claim 1 and including a source of adjustable voltage, a pair of transistors each including a base input element, connections to a common emitter resistor and collector load resistors returned to a source of bias voltage, connections between said bases, said adjustable voltage and said sensing means for providing a differential voltage across said collector resistors, and connections between said collector resistors and said transistor for driving said transistor in a forward direction when the drop across said sensing means is sensibly greater than said adjustable voltage and coupling between said transistor and said resistor to pass current therethrough when said transistor is driven.

6. A direct current voltage regulating system as set forth in claim 1 and including means for adjusting said predetermined magnitude.

7. A direct current voltage regulating system as set forth in claim 1 wherein said resistor is connected between the collector of a transistor in one of the stages of said amplifier and the base of the transistor of the succeeding stage of said amplifier.

References Cited
UNITED STATES PATENTS

| | | | |
|---|---|---|---|
| 3,201,680 | 8/1965 | Ross et al. | 323—9 |
| 3,284,692 | 11/1966 | Gautherin | 323—22 X |
| 3,303,411 | 2/1967 | Gately | 323—4 |
| 3,303,412 | 2/1967 | Gately | 323—4 |
| 3,305,764 | 2/1967 | Todd | 323—9 |

JOHN F. COUCH, *Primary Examiner.*

A. D. PELLINEN, *Assistant Examiner.*